US008428065B2

(12) United States Patent
Dekel et al.

(10) Patent No.: US 8,428,065 B2
(45) Date of Patent: Apr. 23, 2013

(54) GROUP COMMUNICATION SYSTEM ACHIEVING EFFICIENT TOTAL ORDER AND STATE SYNCHRONIZATION IN A MULTI-TIER ENVIRONMENT

(75) Inventors: Eliezer Dekel, Haifa (IL); Gidon Gershinsky, Haifa (IL); Avraham Harpaz, Haifa (IL); Alexander Krits, Haifa (IL); Benjamin Mandler, Zichron Yaakov (IL); Nir Naaman, Haifa (IL); Idan Zach, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/764,233

(22) Filed: Jun. 18, 2007

(65) Prior Publication Data

US 2008/0310444 A1    Dec. 18, 2008

(51) Int. Cl.
*H04L 12/28* (2006.01)
*H04L 12/56* (2006.01)

(52) U.S. Cl.
USPC ........................................................ 370/394

(58) Field of Classification Search .................. 370/328, 370/338, 394; 709/209, 220, 224
See application file for complete search history.

(56) References Cited

U.S. PATENT DOCUMENTS

| | | | | |
|---|---|---|---|---|
| 4,653,048 | A * | 3/1987 | Anderson et al. | 714/49 |
| 6,507,586 | B1 | 1/2003 | Satran et al. | |
| 6,563,794 | B1 * | 5/2003 | Takashima et al. | 370/236 |
| 6,775,279 | B2 * | 8/2004 | Murai et al. | 370/390 |
| 6,959,323 | B1 | 10/2005 | Tzeng et al. | |
| 2004/0264671 | A1 * | 12/2004 | Lamberton et al. | 379/221.03 |
| 2006/0153081 | A1 * | 7/2006 | Simonsson et al. | 370/238 |
| 2006/0168425 | A1 * | 7/2006 | Del Vigna et al. | 712/218 |
| 2007/0214355 | A1 * | 9/2007 | Lamport | 713/156 |
| 2008/0034105 | A1 * | 2/2008 | Tsai et al. | 709/232 |
| 2008/0288607 | A1 * | 11/2008 | Muchow | 709/209 |

OTHER PUBLICATIONS

Author: Jia, Wei-Jia; Kaiser, Joerg; Nett, Edgar Title: Efficient and reliable group multicast protocol Source: Proceedings of the International Symposium on Autonomous Decentralized Systems, 1995, p. 127-133.
Author: Erciyes, K. (Dept. of Comput. Sci., California State Univ., San Marcos, CA, USA); Sahan, A Title: A real-time total order multicast protocol Source: Computational Science—ICCS 2004, 4th International Conference, Proceedings (Lecture Notes in Computer Science. vol. 3036), 2004, pt. 1, 357-64 vol. 1.
Author: Jia, Xiaohua (Univ of Queensland) Title: Total ordering multicast protocol using propagation trees Source: IEEE Transactions on Parallel and Distributed Systems, v 6, n 6, Jun. 1995, p. 617-627 ISSN: 1045-9219.

(Continued)

*Primary Examiner* — Huy D Vu
*Assistant Examiner* — Adnan Baig
(74) *Attorney, Agent, or Firm* — Daniel Kligler

(57) ABSTRACT

A group communication service maintains synchronization limiting the group to the processing entities that receive a plurality of source message streams from sources outside the group and transmit delivery message streams to destinations that are outside the group. Synchronization of message ordering and other state synchronization directives are communicated from a leader exclusively to other group members. Once having declared themselves to be synchronized and active by a reply protocol message, which is an opaque object and is interpreted by an application layer, the processing entities independently process the source message streams in accordance with the order specified in the directives, without requiring additional sequencing information from another processing entity.

20 Claims, 13 Drawing Sheets

OTHER PUBLICATIONS

Authors: Singh, G.; Badarpura, S. Title: Application ordering in group communication Source: Proceedings 21st International Conference on Distributed Computing Systems Workshops, Nov. 16, 2001.

Authors: Beier, Ines ; Konig, Hartmut Title: Protocol supporting distributed group and QoS management Source: Proceedings of the IEEE Conference on Protocols for Multimedia Systems and Multimedia Networking, PROMS-MmNet, 1997, p. 213-222.

Authors: Itaya, Satoshi; Enokido, Tomoya; Takizawa, Makoto Title: Group communication protocol for atomic and causal delivery of multimedia messages Source: International Conference on Database and Expert Systems Applications—DEXA, v 15, Proceedings—15th International Workshop on Database and Expert Systems Applications, 2004, p. 342-346.

Authors: Cheng, W.C.H.; Kutti, S.; Jia, X. Title: Towards fault-tolerant and synchronous multicast protocols for distributed systems Source: Proceedings of the ISCA International Conference. Parallel and Distributed Computing Systems, 1996, pt. 1, 418-25 vol. 1 Abstract only.

Chockler et al. "Group Communication Specifications: A Comprehensive Study," ACM Computing Surveys 33:4 (Dec. 2001), pp. 1-43.

Chiu et al. "Total Ordering Group Communication Protocol Based on Coordinating Sequencers for Multiple Overlapping Groups," Journal of Parallel and Distributed Computing 65 (2005), pp. 437-447.

\* cited by examiner

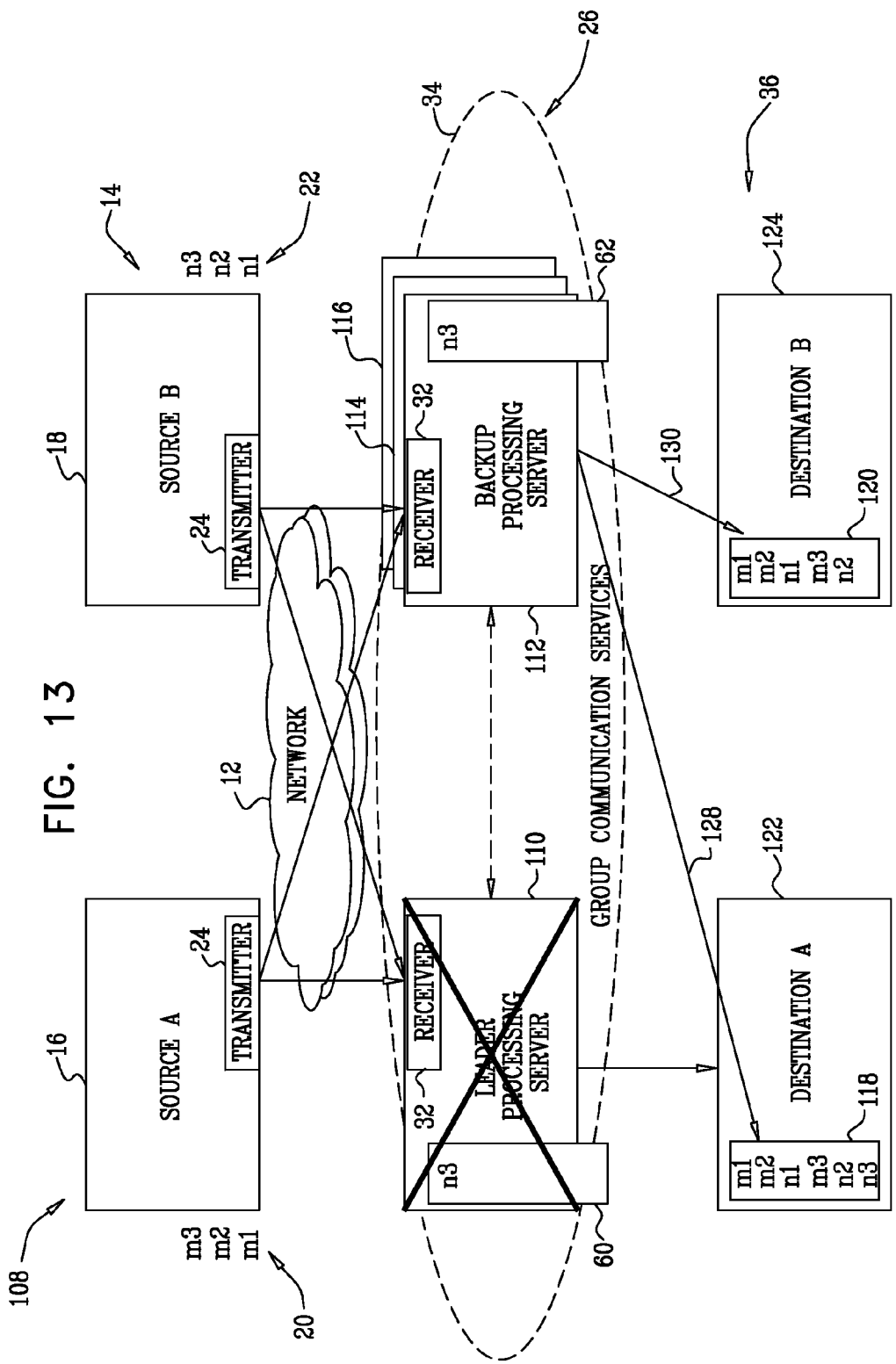

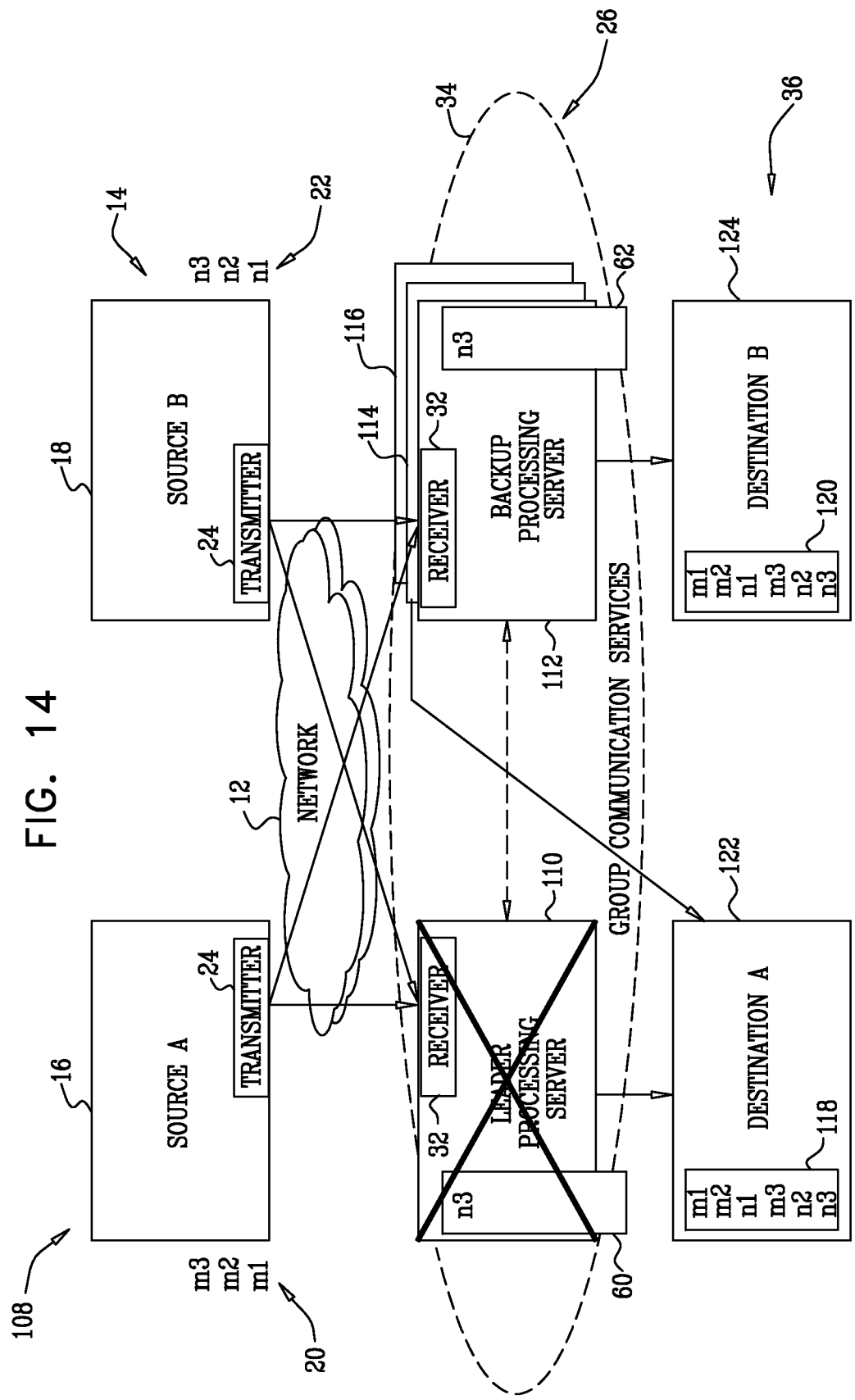

GROUP COMMUNICATION SYSTEM ACHIEVING EFFICIENT TOTAL ORDER AND STATE SYNCHRONIZATION IN A MULTI-TIER ENVIRONMENT

CROSS-REFERENCE TO RELATED APPLICATIONS

This Application shares disclosure with application Ser. No. 11/764,232, entitled "Synchronization of Message Stream in a Multi-tier Messaging System", whose disclosure is herein incorporated by reference.

BACKGROUND OF THE INVENTION

1. Field of the Invention

This invention relates to communication of information across a data network. More particularly, this invention relates to improvements in synchronization using a group communication service.

2. Description of the Related Art

TABLE 1

| Acronyms and Abbreviations | |
| --- | --- |
| ACK | Acknowledgement |
| DCS | Distribution and Consistency Services |
| FIFO | First In First Out |
| GCS | Group Communication System |
| NACK | Negative Acknowledgement |
| PGM | Pragmatic General Multicast |
| QoS | Quality of Service |

A group communication system (GCS) provides multi-point to multi-point communication by organizing processes in groups. Distributed group communication systems enable applications to exchange messages within groups of processes in a cluster of computers. A group communication system provides a variety of semantic guarantees for the messages being exchanged, such as reliability, synchronization, and ordering. For example, in response to an application request, a group communication system may ensure that if a message addressed to the entire group is delivered to one of the group members, the message will also be delivered to all other live and connected members of the group, so that group members can act upon received messages and remain consistent with one another.

Chockler et al. provide a useful overview of group communication systems in "Group Communication Specifications: A Comprehensive Study," *ACM Computing Surveys* 33:4 (December, 2001), pages 1-43, which is herein incorporated by reference. This paper focuses on view-oriented group communication systems, which provide membership and reliable multicast services to the member processes in a group. The task of a membership service is to maintain a list of the currently active and connected processes in the group. The output of the membership service is called a "view." The reliable multicast services deliver messages to the current view members.

Various methods are known in the art for maintaining the desired message delivery order in a group communication system. Chiu et al. describe one such ordering protocol, for example, in "Total Ordering Group Communication Protocol Based on Coordinating Sequencers for Multiple Overlapping Groups," *Journal of Parallel and Distributed Computing* 65 (2005), pages 437-447, which is herein incorporated by reference. Total order delivery, as described in this paper, is characterized by requiring that messages be delivered in the same relative order to each process. The protocol proposed by the authors is sequencer-based, i.e.; sequencer sites are chosen to be responsible for ordering all multicast messages in order to achieve total order delivery.

A reliable multicast protocol is often used to send and receive messages in group communication systems. Reliable multicast protocols use message or packet streams to deliver messages. An example of such a protocol is Pragmatic General Multicast (PGM), the specification of which is presented in Network Working Group RFC 3208. The stream is the basic entity over which reliability is maintained. PGM supports any number of sources within a multicast group, each fully identified by a globally unique transport session identifier.

Another reliable multicast transport arrangement is disclosed in commonly assigned U.S. Pat. No. 6,507,586, whose disclosure is herein incorporated by reference. A data transmission system is described, which has a single transmitter and a plurality of receivers where the transmitter sends a group of data items to a subset of receivers over a one-way channel.

Another synchronization approach in a group communication service is proposed in U.S. Pat. No. 6,959,323, issued to Tzeng, et al. This document describes a protocol for synchronizing states of nodes in a distributed multicasting environment. The arrangement employs a dedicated sequencer, which is responsible solely for assigning sequence numbers to multicast messages. The sequencer does not multicast the messages. Commit servers store the ordering information for each message. Data servers store the data messages sent to the group. Messages are consolidated using checkpoint servers, and sent to clients. The arrangement purports to ensure both atomicity and total order among messages sent to a multicast group.

SUMMARY OF THE INVENTION

An embodiment of the invention provides a computer-implemented method for communication, which is carried out by receiving incoming message streams of first client messages in a group of processing entities from a plurality of sources that are outside the group, and detecting a requirement for synchronizing the processing entities. The method is further carried out responsively to the requirement by transmitting a control protocol message only to the processing entities, which directs the processing entities to conform to a governing group state. The control protocol message may direct an order of processing the first client messages.

The method is further carried out responsively to a receipt of the control protocol message by respectively adjusting the processing entities in accordance with the control protocol message, and issuing respective acknowledgement protocol messages from the processing entities that are communicated only within the group. The method is further carried out by communicating respective outgoing message streams of second client messages in identically sequenced units from the processing entities to one or more destinations that are outside the group.

In an aspect of the method, one of the processing entities is designated as a leader. The leader may initiate outgoing message streams upon receipt of the incoming message streams, and the other processing entities may delay their respective outgoing message streams until receipt of an order of processing the first client messages from the leader. If a failure of the leader occurs, the method is further carried out by electing a new leader among the processing entities, querying the destinations to recover respective instances of the transmission order of the second client messages therefrom, determining a common transmission order of the second client messages from the respective instances, and sending a directive from the new leader to the other processing entities to complete communicating respective outgoing message streams in the common transmission order.

Other embodiments of the invention provide computer software product and apparatus for carrying out the above-described method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 6-FIG. 14 are a time sequence of block diagrams illustrating states of a multi-tiered cluster of nodes operating in accordance with an alternate embodiment of the invention.

DETAILED DESCRIPTION OF THE INVENTION

Figure 1:
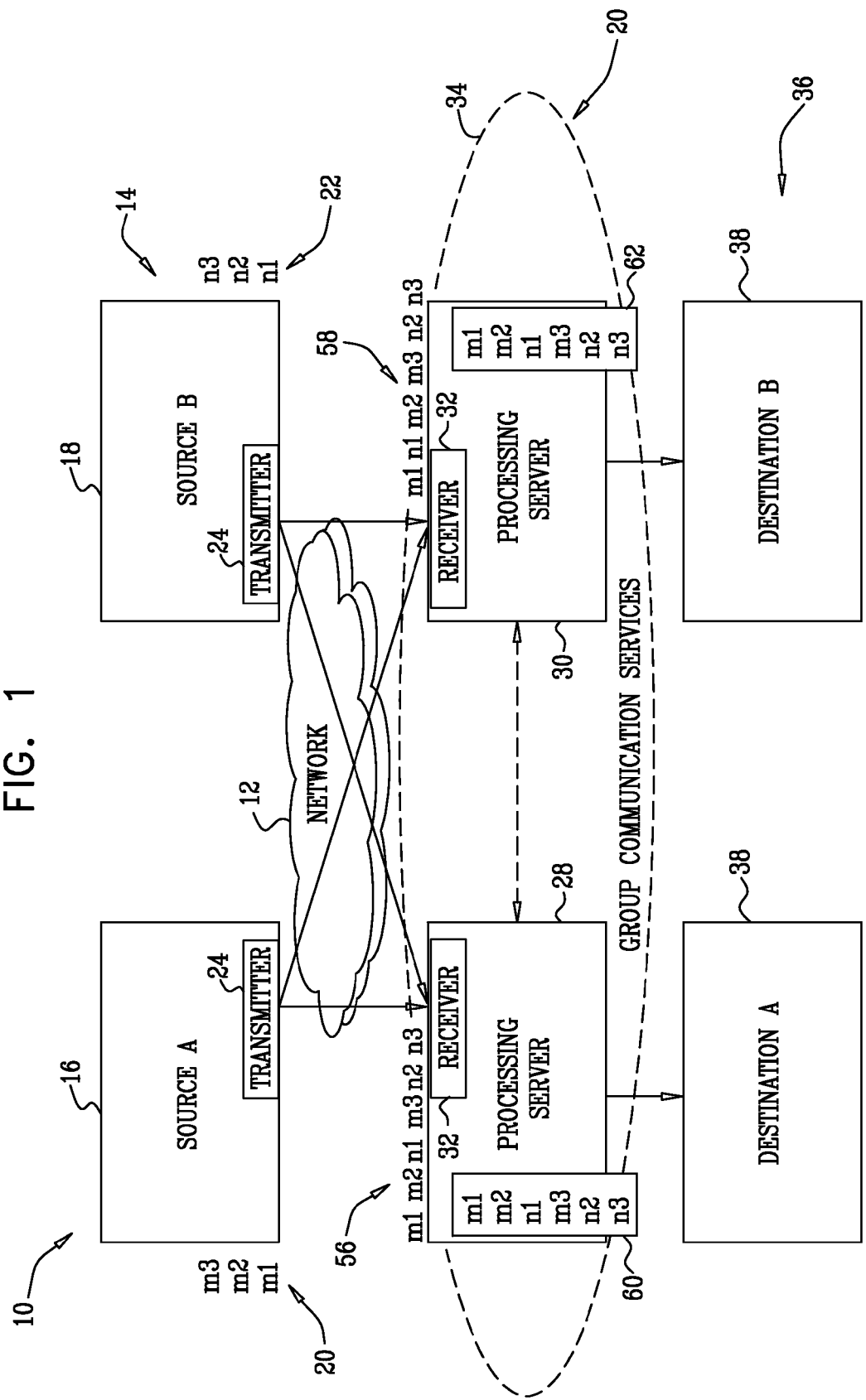
FIG. 1 is a block diagram of an exemplary multi-tiered cluster of nodes connected by a network that includes a group communication service, which is suitable for carrying out the principles of the present invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

DEFINITIONS

"Client messages" include communications issued by sources, and are termed "incoming client messages". Client messages also include messages transmitted to destinations. The latter client messages, termed "outgoing client messages," are outcomes of processing the communications issued by the sources in a group communication service. Both varieties of client messages are distinguished from internal messages transmitted within the group communication service. The internal messages are referred to as "control protocol messages" or "reply protocol messages" as the case may be.

Overview.

In embodiments of the invention, total order is efficiently maintained in a multi-tiered multi-point to multi-point communication environment.

There are several sources generating incoming client messages that are delivered to a set of processing servers. After processing by the processing servers, the same or derivative outgoing client messages are then delivered to a set of destinations. In this arrangement, all incoming client messages are multicast or unicast to the processing servers by the sources in different combinations, the sources potentially sending the incoming client messages via multiple message streams. While this arrangement assures high availability, there is a requirement for synchronizing the work among all the processing servers, in particular, guaranteeing that all processing severs process all incoming client messages in the same order, thus reaching the same end result. According to aspects of the invention, the synchronization problem is solved by providing an underlying group membership mechanism, in which the group includes the processing servers, and excludes the sources and destinations of the client messages. The mechanism keeps track of group membership, monitors the state of each member, and provides a leader election service. A control protocol is used to achieve and maintain state synchronization within the group and assure total client message ordering, which is effected by communication of control protocol messages, using a QoS in which reception by the members of the group is guaranteed.

In one aspect of the invention, disassociating the sources and final destinations from the group communication system is applied in combination with the control protocol, and results in improved scalability and flexibility. Furthermore, low latency and high messaging throughput result from another aspect of the invention, wherein group state synchronization and a total ordering of client messages are achieved with fewer "hops" than was possible using conventional group communication service arrangements.

Group messaging that is described below refers to communications among group processing entities, which may be hardware entities, such as computers, or software entities, such as processes executing on servers or on other computing devices, and may encompass embodiments in which group processing entities are distributed among different processing computing devices, or realized as multiple processes concurrently executing on one computing device.

System Architecture.

Turning now to the drawings, reference is initially made to FIG. 1, which is a block diagram of an exemplary multi-tiered system 10 having a cluster of nodes connected by a network 12, in accordance with an embodiment of the present invention. Each node comprises a computer processor and a communications adapter linking the node to the network. Different nodes may comprise different types of computers or servers, which may also have different operating systems. In alternative embodiments, the principles of the present invention, and specifically the methods described hereinbelow, may be implemented in group communication and messaging systems of other types. The purpose of the arrangement is to provide multi-point to multi-point communication using a group communication service. The format and communications protocol of control protocol messages are not necessarily the same as the format and multicast protocol used to receive incoming client messages and deliver outgoing client message streams between the group communication service members and the sources and destinations, which are external to the group communication service.

The system 10 includes a sources tier 14, having any number of sources, represented in FIG. 1 by sources 16, 18, which emit a message stream 20 $m_1 \ldots m_n$ and a message stream 22 $n_1 \ldots n_n$, respectively, using transmitters 24. A servers tier 26 comprises one or more processing servers, represented in FIG. 1 by servers 28, 30, which receive messages from nodes of the sources tier 14 using receivers 32 and form a group communication service 34. Multiple processing servers are desirable in the servers tier 26 for reasons of fault tolerance and availability. Furthermore, all of the sources 16, 18 send their data to all the servers 28, 30, which increases availability of the content should a portion of the processing servers fail.

The system 10 has a destinations tier 36 that has any number of destinations 38. The destinations 38 receive, and may post-process the client messages that are sent to them by the servers 28, 30. In general, the sources 16, 18 are unaware of the destinations 38. Furthermore, in different embodiments of the system 10, the processing servers comprising the servers tier 26 may have different capabilities, e.g., processing speed and buffer capacity. According to an aspect of the invention, the group communication service 34 is limited to the servers tier 26, and excludes the nodes of the sources tier 14 and the destinations tier 36. As a result, network traffic is considerably reduced, and scalability and latency are improved.

The sources 16, 18 transmit the client message streams 20, 22 via the network 12 to the servers 28, 30 typically using a known reliable multicast transport protocol, which can be the aforementioned PGM protocol. Typically, a governing policy designates what each processing server in the servers tier 26 does with an incoming client message and specifies an outcome once it has been processed. For example, a policy may require that all processing servers transmit outgoing client messages, i.e., processing results to the destinations 38. At the destinations 38, one of the transmissions is selected for further processing. It will be recalled from the foregoing discussion that all the transmissions to the destinations are equivalent.

Additionally or alternatively, there can be many system policies that determine the behavior of each processing server. For example, such a policy may require designation of active and backup servers, wherein the latter process in the same manner as the former, but do not transmit processing results to the destinations 38. Should an active server fail, a backup server may become active and start transmitting outgoing client messages to the destinations.

Figure 2:
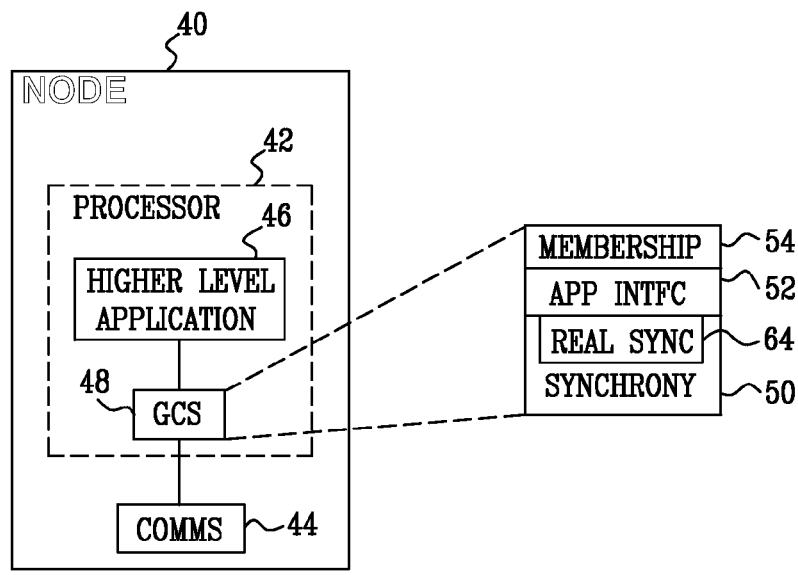
FIG. 2 is a detailed block diagram of a server of the group communication service shown in FIG. 1, in accordance with a disclosed embodiment of the invention.

Reference is now made to FIG. 2, which is a detailed block diagram of a processing server of the group communication service 34 (FIG. 1), (referenced in FIG. 2 as server 40), in accordance with a disclosed embodiment of the invention. The server 40 comprises a processor 42 and a communications adapter 44, linking the server 40 to the network 12 (FIG. 1) and to other servers of the group communication service 34. The processor 42 includes a memory and runs application software stored therein, which instantiates an application layer, referenced as higher level application 46 that exercises control functions with respect to the group communication service. The higher level application 46 may be distributed among multiple processing servers. The server 40 communicates with other processing servers of the group communication service 34 using a group communication system layer 48. The processor 42 typically comprises a general-purpose computer processor, which are programmed in software to carry out the functions described hereinbelow.

In an exemplary embodiment, the group communication system layer 48 comprises DCS, a group communication component implementation. DCS is described, for example, by Farchi et al., in "Effective Testing and Debugging Techniques for a Group Communication System," *Proceedings of the* 2005 *International Conference on Dependable Systems and Networks* (DSN'05). DCS is a view-oriented component, and runs beneath the higher level application 46. It comprises a stack of multiple layers, including a messages synchrony layer 50, an application interface layer 52, and a membership layer 54. Control protocol messages between the higher level application 46 on different servers pass through the application interface layer 52 and the appropriate messages synchrony layer 50 to an underlying transport module associated with the communications adapter 44, and then back up through the same stack on the target servers. The membership layer 54 keeps track of the current view members and handles view changes. The messages synchrony layer 50 and the application interface layer 52 are responsible for ensuring that incoming client messages are processed in the proper order, as described hereinbelow.

Referring again to FIG. 1, in general, the sources 16, 18 are not time-synchronized with one another or with the servers 28, 30, and different message streams are received asynchronously by the servers tier 26. The incoming client messages or packets of the message streams are associated with sequence numbers that typically change monotonically.

While the received client message sequence order of each stream at the servers 28, 30 is guaranteed by the reliable multicast transport protocol, due to network latencies, the servers 28, 30 are not guaranteed to receive any given incoming client message at the same time from any of the message streams. For example, the servers 28, 30 have received the client message streams 20, 22 in different message orders 56, 58 respectively.

Nevertheless, from the perspective of the destinations 38, the servers 28, 30 are required to be interchangeable, in that their outgoing client message transmission sequences are delivered in identical message orders, as shown in buffers 60, 62.

There is a total message ordering, in the sense that incoming client messages, or messages derived from incoming client messages sent by the sources 16, 18, for example, using messaging middleware, are processed by each of the servers 28, 30 in exactly the same order. As a result of processing by the servers 28, 30, outgoing client messages are sent to the destinations 38. At the destinations 38, total ordering is not required in order to implement the principles of the invention.

According to aspects of the invention, total message ordering of client messages is achieved by efficiently distributing consistent message order information and synchronizing the state of the group communication service 34, an element of which is the membership layer 54 (FIG. 2). The group communication service 34 provides standard services, including a consistent list of group members, referred to herein as a "view", leader election, and control protocol message communication with specific quality of service guarantees, e.g., FIFO, virtual synchrony, and real synchrony. In general, the ordering properties of the group communication service 34 restrict the order in which control protocol messages are delivered. In some embodiments, a reliable multicast transport protocol is employed for control protocol messages. The reliability properties of the reliable multicast protocol extend the ordering properties by prohibiting gaps in the sequence of messages. However, the use of a reliable multicast transport protocol is not critical, and other transport mechanisms may alternatively be employed for control protocol messages.

While incoming client messages from the sources 16, 18 may not reach the servers 28, 30 in the same order, as noted above, there is a requirement for the group communication service 34 to provide a total ordering of client messages. To that end, sequencer-based ordering ensures a consistent outcome at the destinations. Furthermore, using multiple servers ensures fault tolerance in the case of a server failure. However, as noted above, it is possible to operate the servers tier 26 with a single server, although fault tolerance will be reduced.

Notably, the group communication service 34 excludes any server outside the servers tier 26. The servers 28, 30 are synchronized to process all the incoming client messages sent by the sources 16, 18 in exactly the same order in order to maintain a total message order. In order to maintain client message synchronization, the servers 28, 30 need to intercommunicate efficiently.

Incoming client messages may be combined into transport packets by the sources 16, 18, e.g., by messaging middleware. In this case, the servers 28, 30 synchronize based on transport packet sequences rather than individual client message sequences, under direction of the group communication leader in order to achieve total ordering. Processing of such packet streams is performed in the same manner as individual incoming client message streams, as described below.

When the servers 28, 30 transmit and receive control protocol messages relating to events, the mechanisms described below also ensure proper ordering of these messages. Thus, event-related group protocol messages are examples of control protocol messages, dealing with management and control of the group communication service 34. Events of this sort may be generated, for example, when the view changes, when the current view is about to close, when a certain member is about to leave the view, or when a process is about to terminate. The term "control protocol message", should therefore be understood to include messages that report events.

Control protocol messages are generally sent via a real synchrony QoS provided as part of the group communication service 34. When real synchrony is in force, the sender is blocked until the group communication service 34 ensures that all the receivers have acknowledged receipt of the protocol message. Alternatively, the sender may be blocked until a predetermined number of acknowledgement signals (ACKs) or reply protocol messages have been received. The use of real synchrony is advantageous, as it provides the highest timely guarantee that a protocol message has been delivered to all receivers, and thus all servers will remain in synchronization.

Referring again to FIG. 2, a real synchrony mechanism 64 is built on top of the messages synchrony layer 50 below the application interface layer 52 The real synchrony mechanism 64 assures that (1) all members of a succeeding view received the last ordering information control protocol message that was multicast to the group, or (2) none of them received it. In either case, client message processing by the processing servers of the new view continues in a coherent manner.

Client messages sent by the sources 16, 18 can be reclaimed by the servers 28, 30 in case of message loss via a NACK based re-transmission mechanism, which is provided by the reliable multicast transport protocol. The servers 28, 30 process all the messages and send them to the destinations 38, typically multiplexed.

The group communication service 34 allows an opaque state object to be distributed among the group members, (the servers 28, 30 in FIG. 1) in a consistent manner. However, the group members do not inspect an opaque state object to determine its characteristics. Instead, it is interpreted by the higher level application 46 (FIG. 2). Typically, in the operation of the group communication service 34, the opaque state object contains information about the states of all the servers of the servers tier 26, e.g., the client message streams they are currently accepting, packets they have processed.

Outgoing client messages, which as noted above, are processing outcomes derived from incoming client messages, are passed on to their respective destination or destinations, where they may be further post-processed. As shown in FIG. 1, there can be multiple destinations 38, which as noted above, are not members of the group communication service. All the destinations 38 may receive the outcome of the client message processing by the servers 28, 30, and act appropriately.

Alternatively, in some applications, each outgoing client message is sent to a single destination. If logging of events is needed, one or more of the destinations 38 may log each outgoing client message. A unified time stamp mechanism is provided in the servers tier 26 of the group communication service 34 in order to ensure that consistency is achieved, regardless of which processing server sent an outgoing client message to its destination. This mechanism ensures that outgoing client messages delivered from each of the servers 28, 30 to their respective destinations 38 based on the same incoming message have exactly the same time stamp. In other words, the timestamp mechanism ensures that all the processing servers process each incoming client message at the same 'virtual time'. Clock synchronization among the servers 28, 30 or among the individual destinations 38 is not required.

In one form of the higher level application 46, the group communication service 34 services a stock exchange operation. The timestamp mechanism allows trade executions to be related to buy-sell requests in order to verify that total ordering has been attained, even when the trades are executed on different stock exchanges and recorded in different databases. The trade execution sequence, including the buy-sell request times, are found on timestamps of outgoing client messages.
Synchronization Issues.

When servers first join a group they are all at a "not synchronized" state, until one of the servers is elected to be the leader. At that point, the leader is assumed to have the most up-to-date group state information. Thus, every other server that wishes to be synchronized and be able to start processing incoming client messages needs to learn the governing state from the leader. Initially, a new leader disseminates its state to all other active servers in the group, When new servers subsequently come up and join the group the current application state will be distributed again to the new servers, and the current server state is distributed to all the participating servers. Every change of membership in the group or change of state of members in the group will trigger a re-distribution of the most up-to-date state. Once the synchronization procedure has finished for a particular server, it notifies the group communication service, which keeps track of the state of all servers and makes sure that all members in the group have a consistent view of group members and their state. The state that is synchronized via the membership layer 54 consists of an opaque object, which is interpreted at the higher level application layer. The object additionally includes members' state information and leader identification data, both of which are maintained and disseminated by the membership layer 54 (FIG. 2) of the group communication service.

Figure 3:
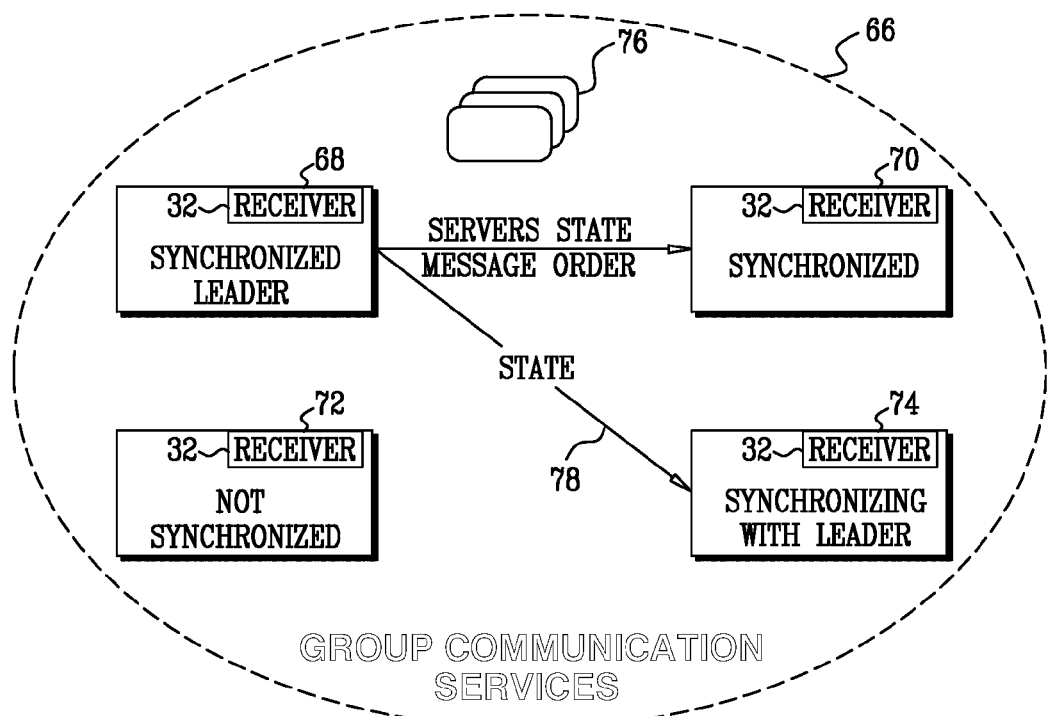
FIG. 3 is a block diagram of a group communication service illustrating state synchronization of group members, in accordance with a disclosed embodiment of the invention.

Reference is now made to FIG. 3, which is a block diagram of a group communication service 66 illustrating state synchronization of the group members in accordance with a disclosed embodiment of the invention. The group communication service 66 comprises a group of servers 68, 70, 72, 74. At a first stage, the server 68 is ready to start processing incoming client messages, and it is elected as the leader. The servers 70, 72, 74 now synchronize their state with the elected leader, and after declaring in control protocol messages that they are active and synchronized, can start processing incoming client messages. In FIG. 3, the server 70 has completed the process. The servers 68, 70 are shown on a list 76 of active and synchronized servers that is maintained and distributed by the membership layer 54 (FIG. 2). The server 74 has received a control protocol message from the server 68, indicated by a connecting line 78, directing it to synchronize its state, and is in the process of synchronization. The server 72 remains unsynchronized. The servers 72, 74 are not included on the list 76.

Operation.

According to aspects of the invention There are two distinct forms of synchronization to be carried out: (1) group state synchronization; and (2) coordination of client message ordering.

Group State Synchronization.

Figure 4:
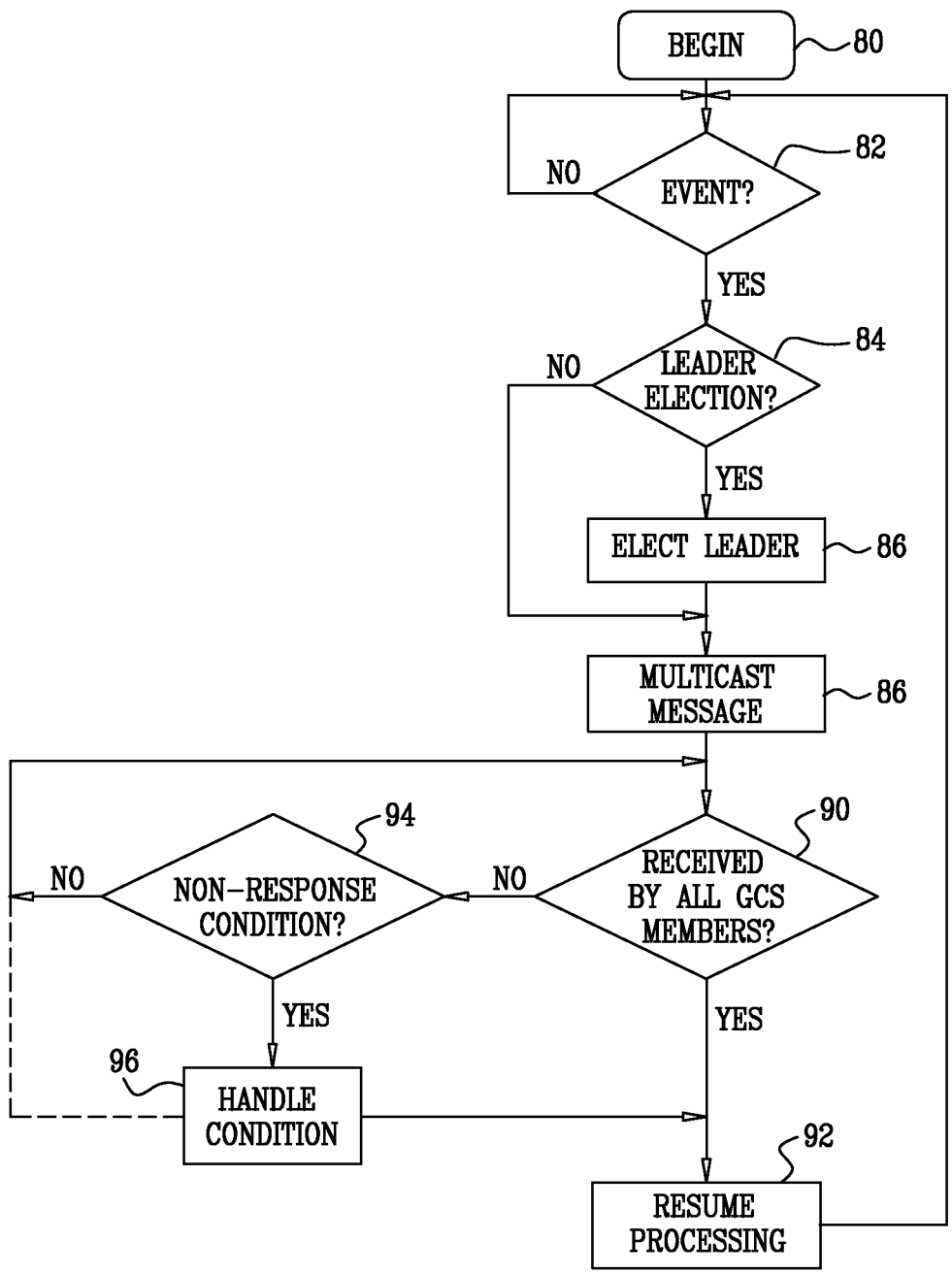
FIG. 4 is a flow chart of a method of synchronizing members of a group communication service, in accordance with a disclosed embodiment of the invention.

Reference is now made to FIG. 4, which is a flow chart of a method of synchronizing the state of members of a group communication service in accordance with a disclosed embodiment of the invention.

The process begins at initial step 80, in which a group communication service is in operating status.

Control now proceeds to delay step 82, where it is determined if an external event has occurred that requires resynchronization of the group state. Many external events can require resynchronization. For example, a new server may be applying to become a member of the group communication service. Alternatively, one of the existing group members may have become inactive. As another example, the leader may have failed. The group state to be synchronized includes diverse information concerning the group operation, which may be necessary to be distributed to the group members, e.g., post-processing instructions for client messages. If the determination at delay step 82 is negative, then the present state of operation simply continues.

If the determination at delay step 82 is affirmative, then control proceeds to decision step 84, where it is determined if a new leader is required to be elected. When servers first join the group, they are all at a "not synchronized" state, until one of the servers is elected to be the leader. Afterward, addition of a new server may not require election of a new leader. Alternatively, a leader re-election may be triggered by failure of the current leader.

If the determination at decision step 84 is affirmative, then control proceeds to step 86. A leader is elected using conventional group communication service methods.

Control proceeds to step 88 after performing step 86, or if the determination at decision step 84 is negative. The leader begins a sequence leading to the dissemination of its current state, which becomes the governing group state, to the members of the group communication service. It will be recalled that the leader is considered the most up-to-date member. A control protocol message, which may include all state information necessary for the members to synchronize their states, is now multicast by the leader to the members of the group communication service. Alternatively, the message could be a message ordering instruction. In general, propagation of the group state is initiated by the leader whenever there is need for a state change, or upon request of a member that needs to be resynchronized.

Next, at decision step 90, it is determined whether each member of the group communication service has acknowledged receipt of the control protocol message. Referring again to FIG. 2, the acknowledgement may be a reply protocol message that is transmitted using the group communication system layer 48, either multicast or unicast, and is ultimately received and interpreted by the higher level application 46. This message could be a simple "ACK." If a member is unable to deal with the control protocol message, it may exit the group and attempt to rejoin at a later time.

As noted above, the real synchrony QoS guarantees receipt of all control protocol messages. Thus, each member of the group communication service is aware of the status of all other members.

If the determination at decision step 90 is affirmative, then control proceeds step 92. The group members resume client message processing. Control returns to delay step 82 to await a new requirement for resynchronization.

If the determination at decision step 90 is negative, then control proceeds to decision step 94, where it is determined if an abnormal condition or non-response is present, e.g., some event has been detected indicating that one or more servers cannot respond.

If the determination at decision step 94 is negative, then control simply returns to decision step 90.

If the determination at decision step 94 is affirmative, then control proceeds to step 96, where the abnormal condition is dealt with. For example, a non-responding server may be excluded from consideration. Control then proceeds to step 92. Under some circumstances, control may return to decision step 90, as indicated by a broken line.

Message Ordering

Referring again to FIG. 1, every so often the group leader determines the sequence in which incoming client messages should be handled, and transmits this information to all other active processing servers in an "ordering information" control protocol message. This operation may be performed following elapse of a predetermined time interval, typically 1-100 ms., or on recognition of an event. After the ordering information control protocol message has been acknowledged by return control protocol messages from the other servers in the servers tier 26, all the servers 28, 30 of the group communication service 34 independently process the client messages, which were covered by the ordering information control protocol message.

Figure 5:
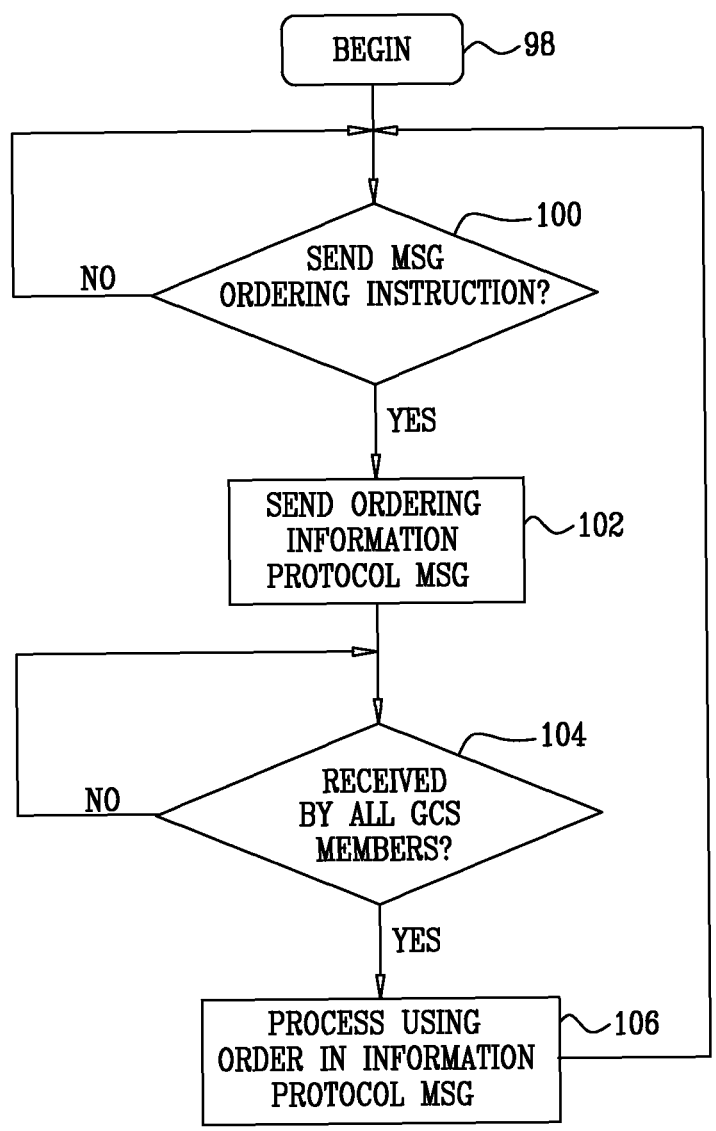
FIG. 5 is a flow chart of a method for synchronizing an ordered delivery of messages using a group communication service, in accordance with a disclosed embodiment of the invention.

Reference is now made to FIG. 5, which is a flow chart of a method for synchronizing an ordered delivery of client messages using a group communication service in accordance with a disclosed embodiment of the invention. The process is viewed from the perspective of the group leader, and begins at initial step 98. A group communication service is in operation, and is receiving client messages from a plurality of sources, as described above with reference to FIG. 1.

Control now proceeds to delay step 100, where it is determined if criteria have been met that would require the group leader to disseminate client message ordering information to the other servers in its tier. These criteria are established by some governing policy, for example, receipt of a predetermined number of client messages, elapse of a predetermined time interval, or some event. If the determination at delay step 100 is negative, then normal operation continues.

If the determination at delay step 100 is affirmative, then control proceeds to step 102. An "ordering information" control protocol message is multicast by the leader to the other members of the group communication service, typically using real synchrony QoS. The ordering information control protocol message is not addressed to the sources and destinations, as they are treated as being outside the group communication service.

Next, at delay step 104, each member of the group communication service acknowledges receipt of the ordering information control protocol message. This step is performed identically to decision step 90 (FIG. 4). The details are not repeated.

When all members of the group communication service have acknowledged receipt of the ordering information protocol message, control exits delay step 104 and proceeds to step 106. All members of the group communication service can begin processing incoming client messages according to the instructions in the ordering information protocol message, without requesting further client-message-by-client-message or packet-by-packet sequencing instructions from the leader or any delegate of the leader. Semi-autonomous operation by the processing servers in accordance with the ordering information control protocol message is an aspect of the invention that averts considerable intra-group traffic.

Control returns to delay step 100 to begin a new iteration of the method.

Leader Administration.

When the leader fails, the group communication service initiates an election of one of the remaining active servers to be the new leader, which immediately assumes the functions of the former leader, in particular, the task of determining the sequence in which client messages should be processed. A leader is changed only if the current leader fails, or if the higher level application declares it to be unsynchronized. In that case, the group communication system elects a new leader and group service operations resume as described above. As noted above, the group communication system guarantees that all surviving nodes are synchronized with respect to the latest ordering information control protocol message from the previous leader.

Failure of a server other than the group leader does not affect the work of the surviving servers. The higher layer application is notified of such a failure by conventional group service crash recovery mechanisms, and may react accordingly. For example, if there are too few remaining active servers, the higher layer application can bring up a new server, and cause it to join the group to provide a reserve, in order that the group can sustain another server failure.

Awareness of server availability or failure enables the higher layer application to choose a mode of operation. It can choose to work in an active or passive servers mode, thus having cold or hot backups. Furthermore, the higher layer application can determine the boundaries within which it is safe to operate. For example, it can impose a policy by which the servers do not start processing incoming client messages unless there is more than one active and synchronized server. Alternatively, it can also require that at any moment in time at least two synchronized servers need to be active in the group communication service for client message processing to continue.

Since client message sources and destinations are not part of the group communication service, they are not affected by intra-group communication activity, which might otherwise reduce overall performance.

Alternate Embodiment

In the previous embodiment one of the servers (or processing entities) is a sequencer, which from time to time decides on a proper processing order of the client messages, and publishes this information to all other servers in its tier. Once acknowledgment is received from its peer processing servers that the ordering message was received, all processing servers independently start to process the client messages based on the predetermined order. The alternate embodiment provides reliable and consistent message streaming at even lower latency than the first embodiment, while maintaining a consistent order of client message delivery from independent data transmitters.

Of course it is necessary to maintain view state synchronization in other respects. These synchronization issues are handled in the same manner as in the first embodiment. The details are not repeated in the interest of brevity.

This embodiment achieves low latency, high throughput, and message total ordering among all the processing servers or processing entities in the servers tier in a different manner. The architecture is the same as described in FIG. 1. The servers tier 26 includes a group of processing servers, bound by a group communication system, and one of them is designated as leader. However, the leader does not wait for incoming client messages to be accumulated, nor for its ordering protocol message to be sent and acknowledged by the other processing servers. Thus, the processing servers are not all in complete lock step at all points in time with respect to client message processing. Rather, the processing servers remain one step behind the leader.

The leader immediately processes each incoming client message, and at that time identifies the outgoing client message in a pending ordering information control protocol message as in the previous embodiment. Once in a while, the leader multicasts the ordering information control protocol message, and the other servers follow this directive.

This arrangement exposes a vulnerability. In case the leader fails, it might have already processed some client messages and sent the results to their destinations. However, the other processing servers do not know about them, and thus might process them in a different order. In order to avoid this result, the outcome of processing client messages sent from the processing servers to the destinations includes historical client message ordering information, beginning at least from the time the previous ordering information control protocol message was sent. The client message ordering information includes the message (or packet) order in which the client messages were sent to the destinations. Historical client message ordering information included in outgoing client messages is normally only appended by the leader, and not by the other processing servers.

In the event of failure of the leader, a new leader is elected. The destinations are queried by the newly elected leader, and new client message ordering information is derived from the results of the queries, taking into consideration any messages that may have been transmitted by the former leader, but not by the other processing servers.

In one alternative, the newly elected leader gathers the correct ordering information from the destinations tier 36 (FIG. 1), and continues to process client messages in the order given by the failed leader. The new leader publishes the new client message processing order to the other processing servers and in other respect operates as a standard leader.

Operation.

Figure 6:
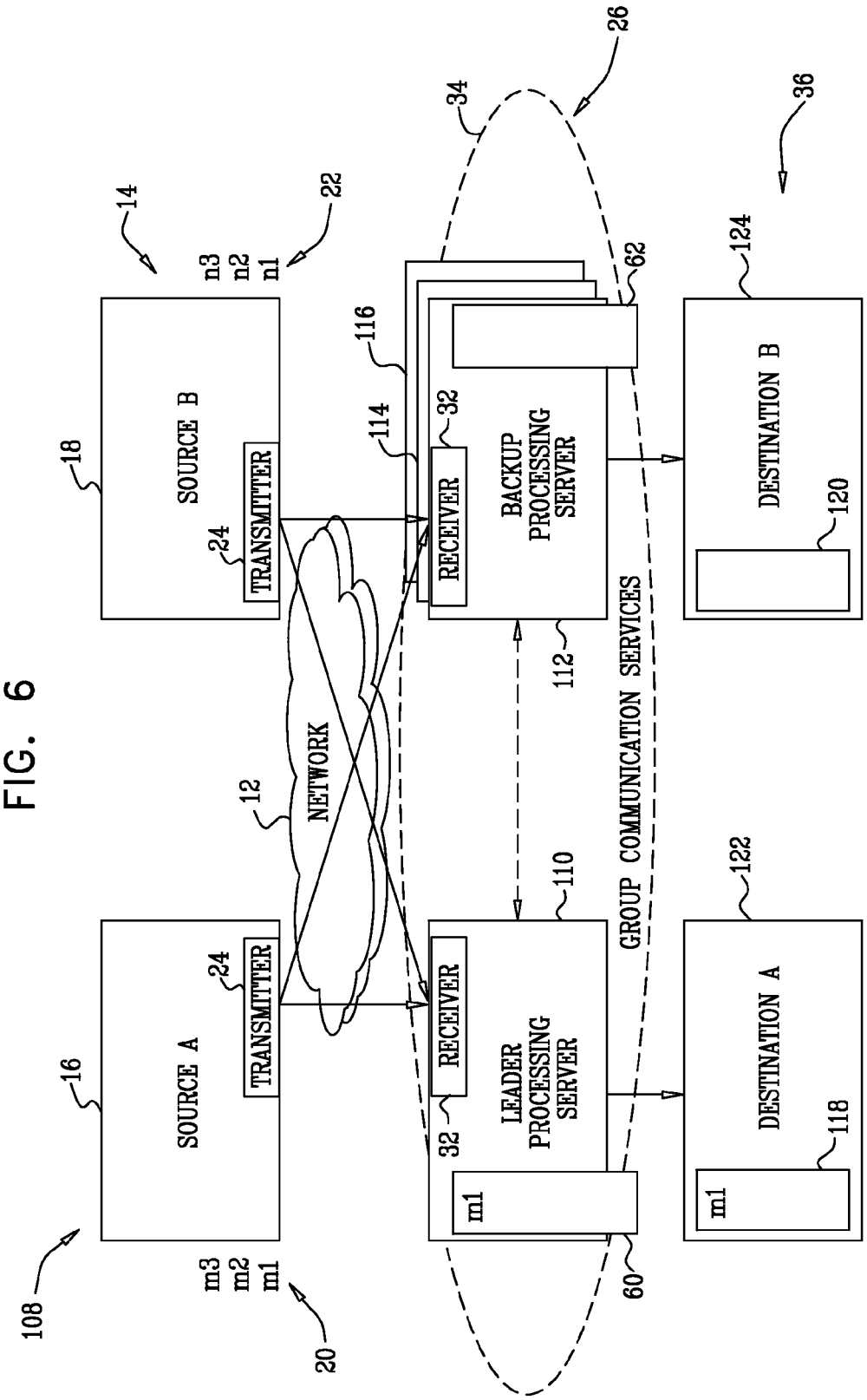

Reference is now made to FIG. 6, which is a block diagram of a multi-tiered cluster 108 of nodes in accordance with a disclosed embodiment of the invention. FIG. 6 is similar to FIG. 1. One of the processing servers in the servers tier 26 has been elected as group leader, and is referenced as leader 110. A processing server 112 is shown as a backup processing server. Additional processing servers 114, 116 are shown in FIG. 6 to emphasize that the servers tier 26 may comprise any number of processing servers that handle incoming client messages. Blocks 118, 120 display client messages in the order received by destinations 122, 124, respectively.

FIG. 6 represents a "snapshot" of an ongoing process of client message handling by the cluster 108. The leader 110 has received a single incoming client message m1 from the source 16, and has transmitted a processing result to the destination 122, as indicated by the block 118. At this point, no incoming client messages have been received by the server 112 (nor by the servers 114, 116). The following figures illustrate a series of states of the cluster 108 at times subsequent to the state shown in FIG. 6.

Figure 7:
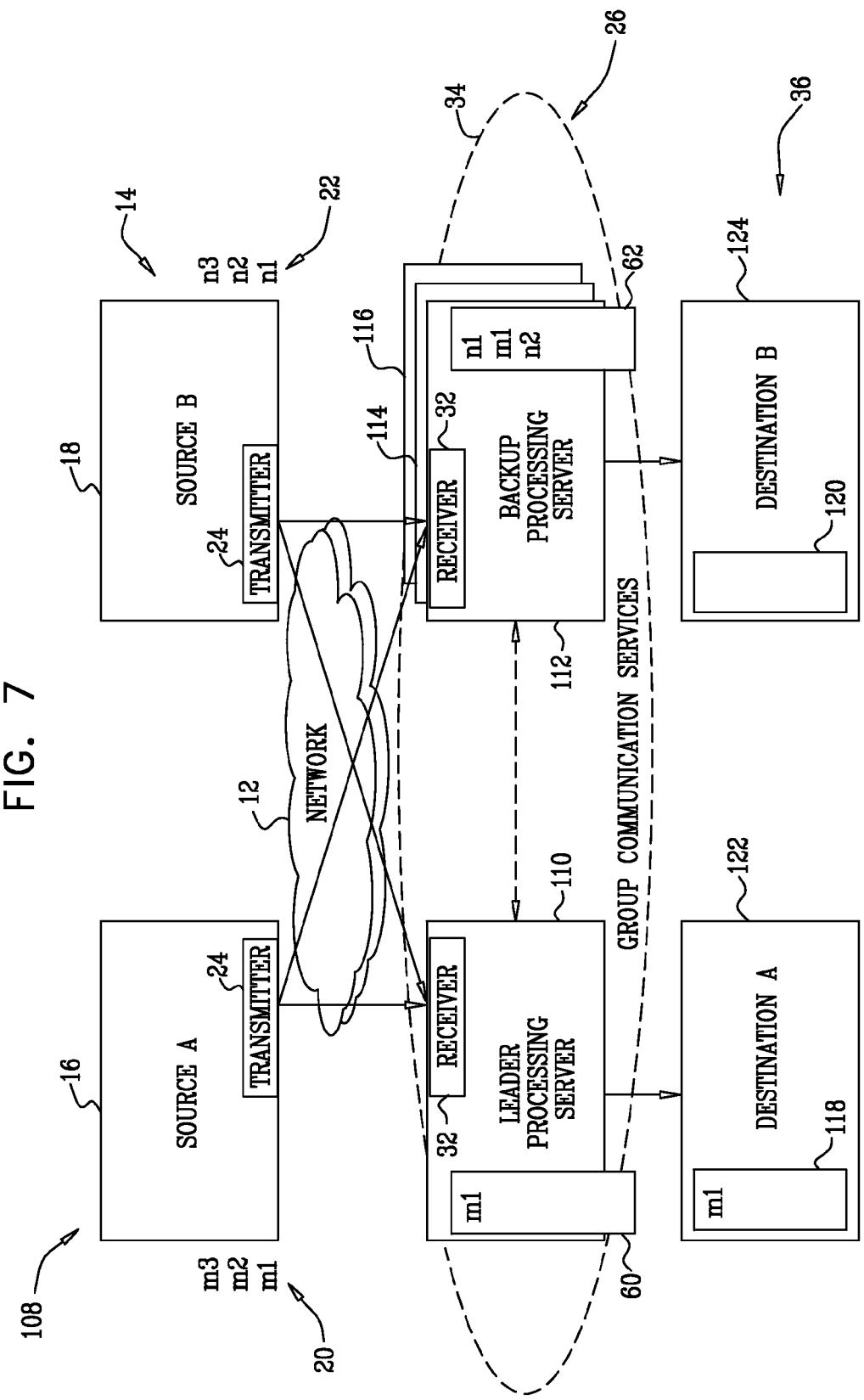

Reference is now made to FIG. 7, which illustrates a subsequent state of the cluster 108. It will be recalled that the order of arrival of client messages in the servers tier 26 from the sources tier 14 is not synchronized or predetermined, and different processing servers may receive client messages in many different orders. In FIG. 7, the status of the leader 110 is unchanged with respect to received client messages. However, now the server 112 contains client messages n1, m1, n2 in the buffer 62, none of which have been delivered to the destinations tier 36.

Figure 8:
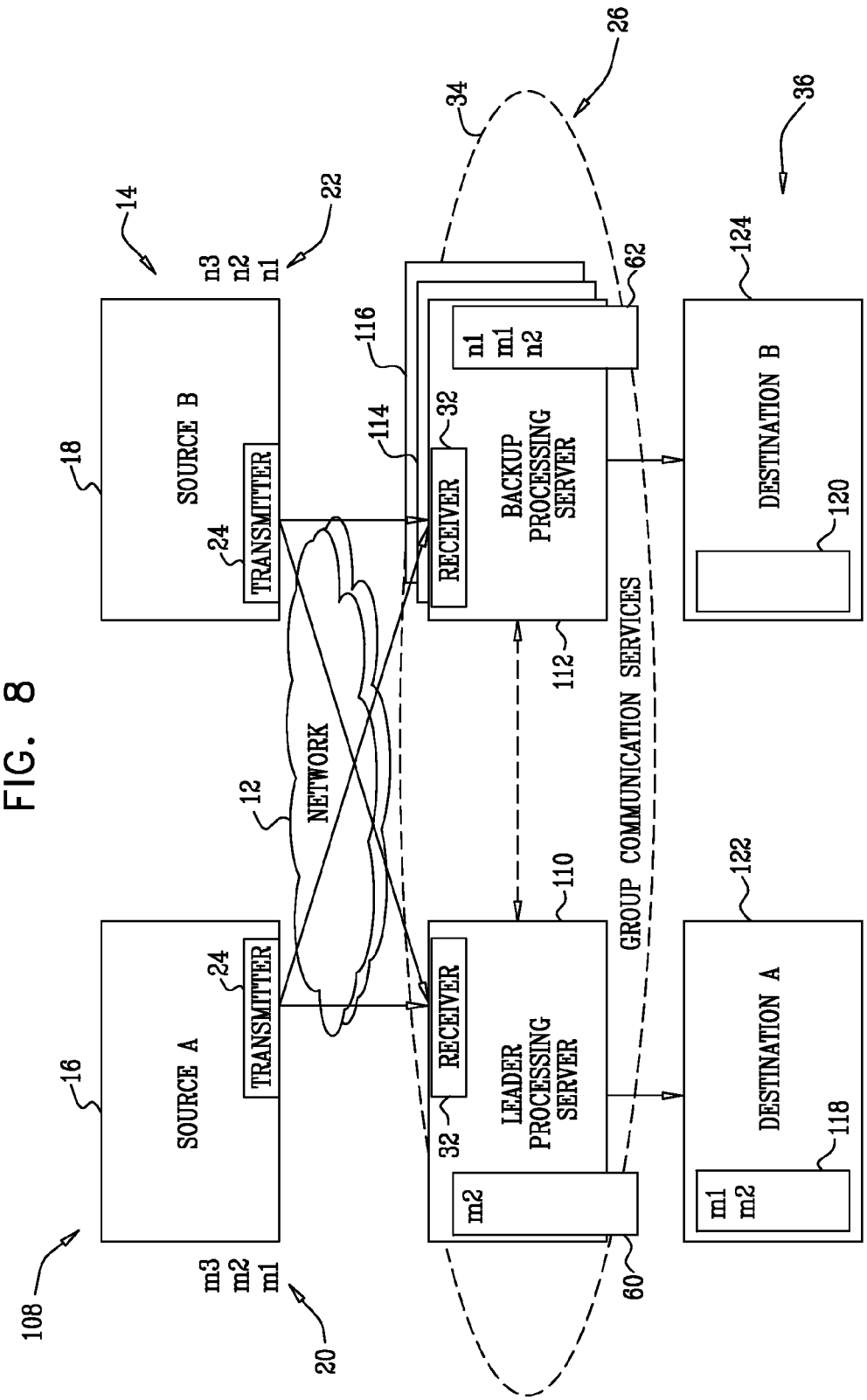

Reference is now made to FIG. 8, which illustrates yet another subsequent state of the cluster 108. The state of the server 112 is unchanged from FIG. 7. However, the leader 110 has now received client message m2, and has transmitted it to the destination 122, as shown in the block 118.

Figure 9:
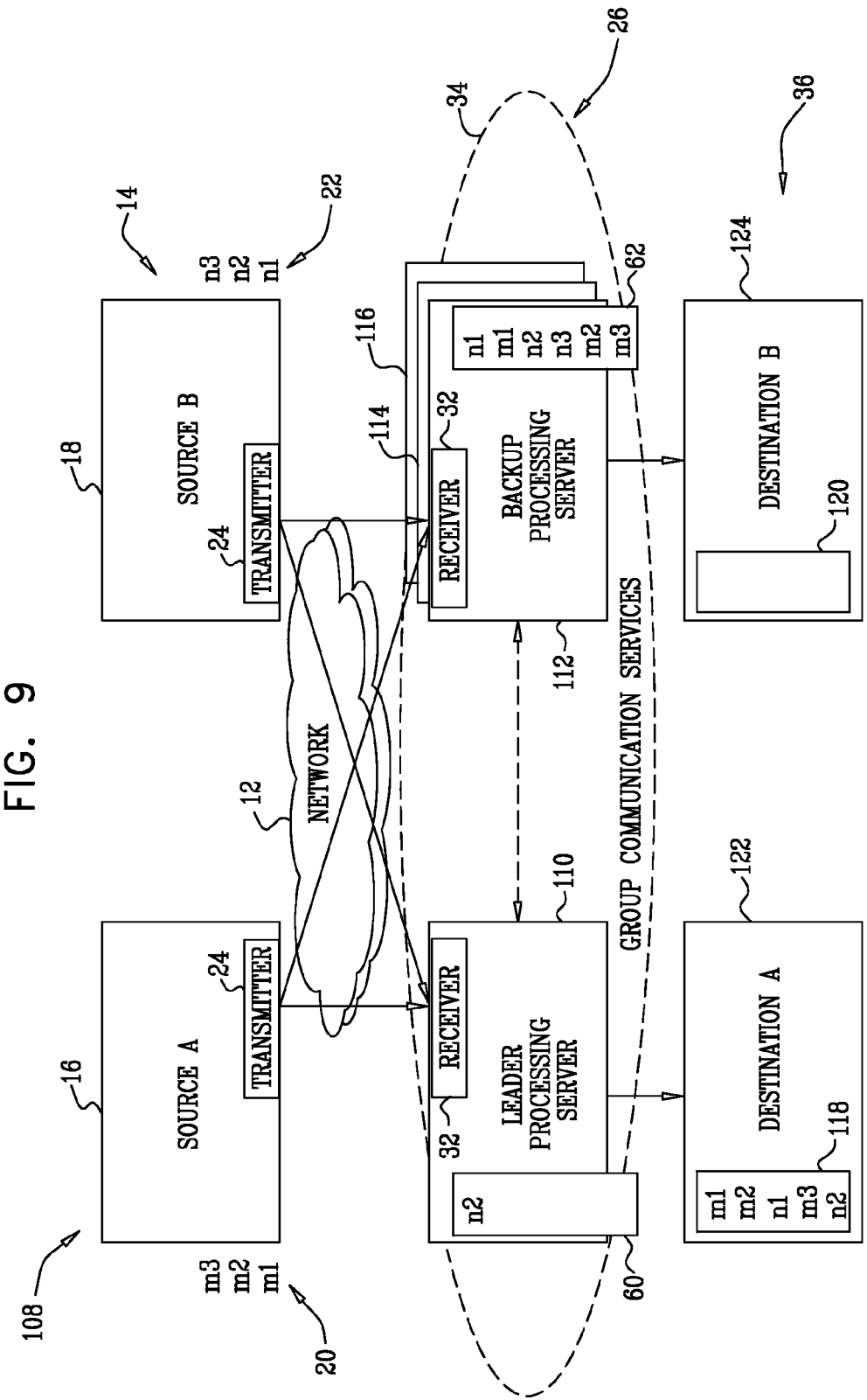

Reference is now made to FIG. 9, which illustrates a further subsequent state of the cluster 108. The process of client message reception has progressed. Client message n2 has most recently been received by the leader 110 and transmitted to the destination 122. The block 118 shows the client message processing order of the leader and its reception by the destination 122 as the client messages m1, m2, n1, m3, n2. Meanwhile, the server 112 has received and buffered client messages n1, m2, n2, n3, m2, m3 in the buffer 62. It will be noted that the message order in the buffer 62 differs from the message order in the block 118. None of the messages in the buffer 62 has been delivered to the destinations tier 36.

Figure 10:
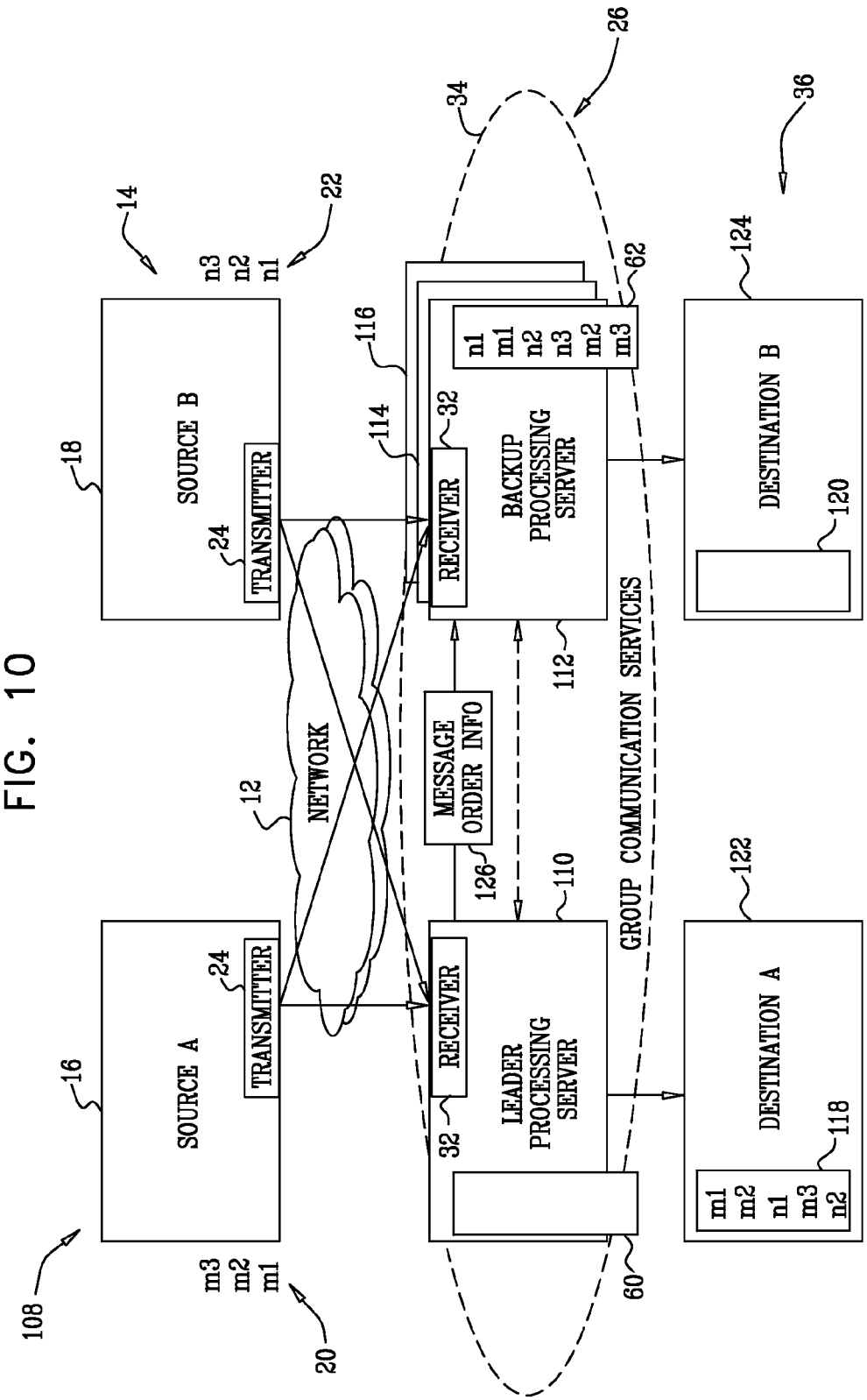

Reference is now made to FIG. 10, which illustrates a subsequent state of the cluster 108. No further message traffic has been received since the time corresponding to FIG. 9. The buffer 60 is now empty. However, using the technique of multicasting protocol messages described above, a control protocol message 126 is being transmitted from the leader 110 to the servers 112, 114, 116, which contains a message ordering directive. It will be recalled from the preceding discussion that the servers 112, 114, 116 will acknowledge the control protocol message 126.

Figure 11:
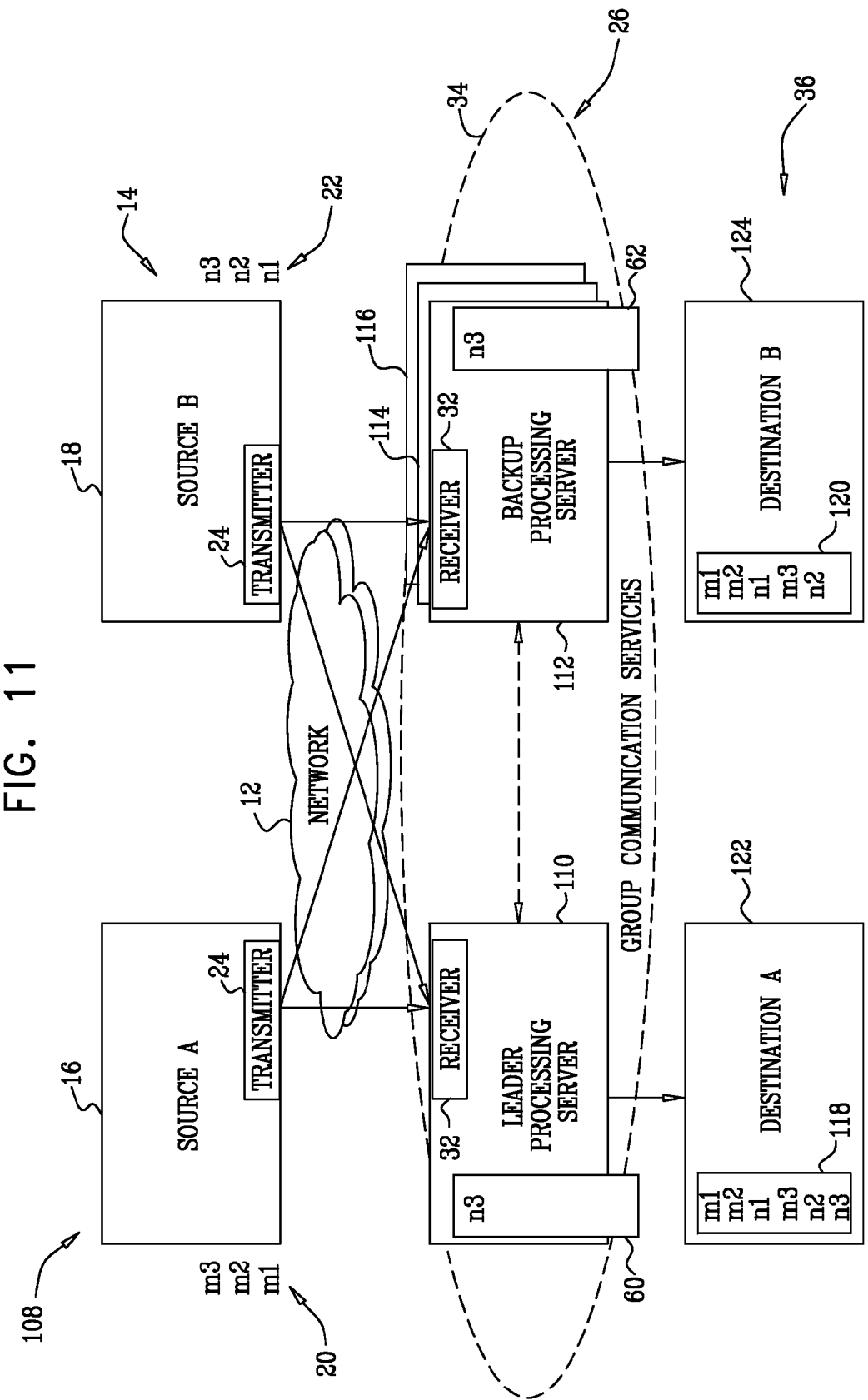

Reference is now made to FIG. 11, which illustrates a subsequent state of the cluster 108. In response to the control protocol message 126 (FIG. 10), the server 112 has transmitted the client messages in its buffer to the destination 124 in the required order. The ordered client messages are shown in the block 120. The message orders of the blocks 118, 120 are identical. Thus, the destinations 122, 124 have received client messages in identical orders but at different times.

Figure 12:
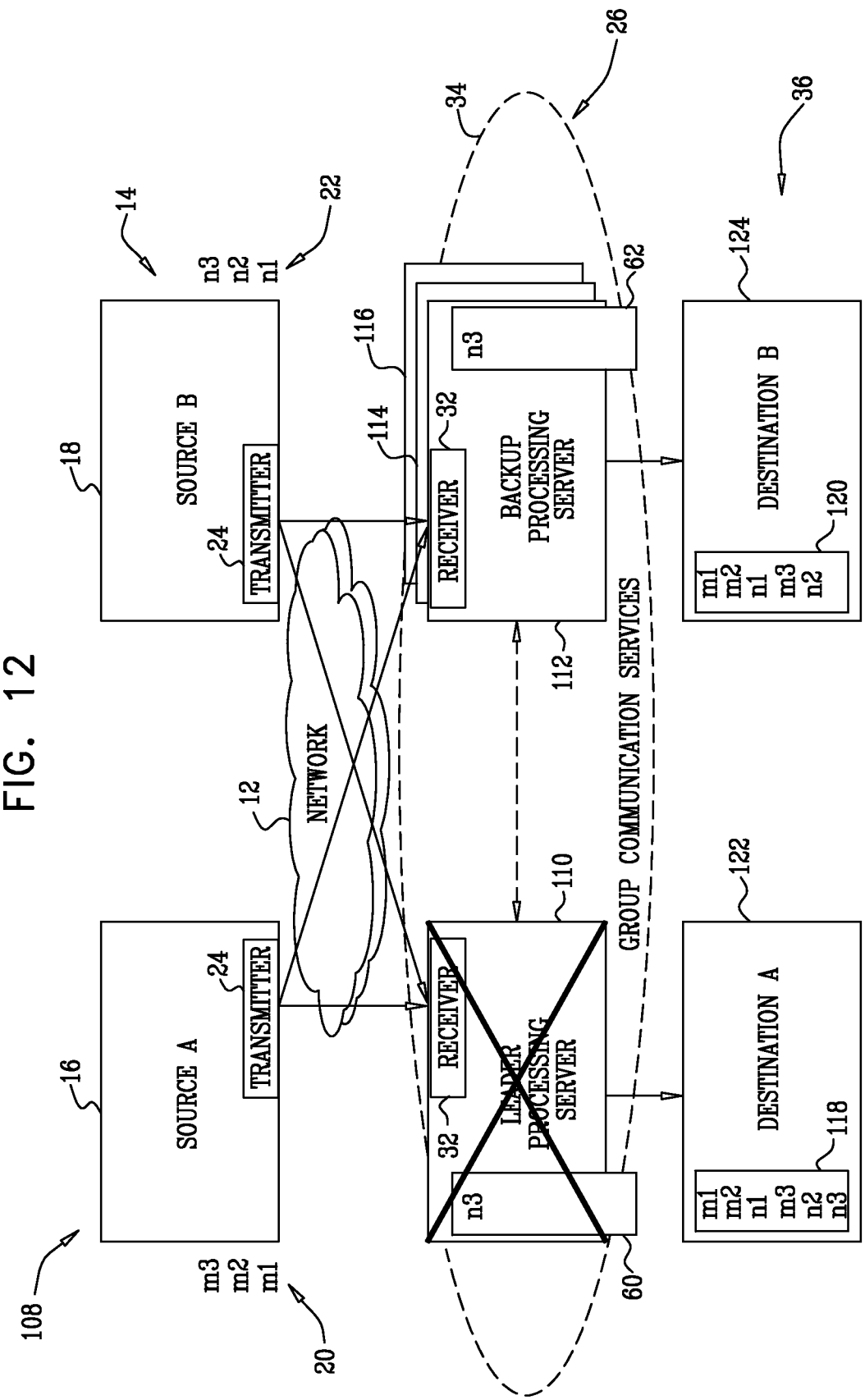

A continuation of the above sequence deals with the consequence of leader failure. Reference is now made to FIG. 12, which illustrates a subsequent state of the cluster 108. A client message n3 has been received by the leader 110 and the server 112. The leader 110 has succeeded in transmitting the client message n3 to the destination 122. The server 112 has not transmitted the client message n3, but is holding it in the buffer 62 as described above. Unfortunately, the leader 110 has now failed, as indicated by an "X" symbol in FIG. 12.

Reference is now made to FIG. 13, which illustrates a subsequent state of the cluster 108. The server 112 has been elected as a new leader. The server 112 has now transmitted queries 128, 130 to the destinations 122, 124, respectively in order to recover the state and order of client message reception. It will be recalled that at least some of the outgoing client messages contain message ordering information. The queries 128, 130 return the information shown in the blocks 118, 120.

Reference is now made to FIG. 14, which illustrates a subsequent state of the cluster 108. Responsively to the queries 128, 130, the server 112 constructs a new ordering of client messages that it will eventually transmit to other processing servers in the servers tier 26. Presently, the order includes only the client message n3, which it transmits to the destination 124. At this point, the destinations 122, 124 are consistent. The server 112 may additionally assign responsibility for the transmission of messages to the destination 122 to one or more of the servers 114, 116 as a routine group services function.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for communication, comprising:
arranging a group of servers to receive concurrently incoming multicast messages from multiple message sources outside the group of servers, and to process the incoming multicast messages to produce multiple outgoing streams of outgoing multicast messages for delivery to recipients outside the group of the servers,
wherein at least some of the incoming multicast messages are received at different servers in the group in different respective message orders;
designating one of the servers as a leader;
periodically determining, by the leader, a common message order for processing of the incoming multicast messages by the servers;
periodically transmitting from the leader to the other servers in the group a control message indicative of the common message order determined by the leader, wherein the control message is transmitted with a quality of service (QoS) that is selected so as to ensure consistent delivery of the multicast messages over all the servers in the group; and
responsively to the control message, processing all the incoming messages at all the servers according to the common message order irrespective of the different orders in which the incoming messages are received and, responsively to the processing, delivering the outgoing multicast messages in the outgoing message streams from the servers to all the recipients.

2. The method according to claim 1, wherein the control message is not sent by or to the message sources or the recipients of the outgoing multicast messages outside the group of the servers.

3. The method according to claim 1, wherein periodically transmitting the control message comprises evaluating a criterion at the leader in order to decide when to send the control message, such that each control message indicates the common message order to be applied over multiple multicast messages.

4. The method according to claim 1, wherein periodically transmitting the control message comprises enforcing a real synchrony QoS, such that the processing of the incoming multicast messages by the servers is blocked until all the servers have received and processed the control message.

5. The method according to claim 4, wherein enforcing the real synchrony QoS comprises receiving at the server acknowledgments of the control message from the other servers, and unblocking the processing of the incoming multicast messages only when at least a predetermined number of the acknowledgments have been received.

6. The method according to claim 1, and comprising detecting a requirement for synchronizing an operational state of the servers, and responsively to the requirement, transmitting a protocol message to the servers directing the servers to conform to a governing operational state of the leader.

7. The method according to claim 6, wherein detecting the requirement comprises detecting a change in membership of the group of the servers.

8. The method according to claim 6, wherein the protocol message comprises an opaque state object.

9. The method according to claim 1, and comprising detecting a failure of the leader and, responsively to the failure, electing a new leader among the servers and synchronizing an operational state of the servers with the new leader.

10. The method according to claim 9, wherein the leader processes the incoming multicast messages without waiting for the control message to be received by the other servers, and then delivers the outgoing multicast messages to at least one of the recipients, and wherein determining the common message order comprises querying the at least one of the recipients by the new leader in order to determine the common message order that was used by the leader prior to the failure.

11. A computer software product, comprising a tangible non-transitory computer-readable medium in which computer program instructions are stored, which instructions, when read by a group of servers, cause the servers to receive concurrently incoming multicast messages from multiple message sources outside the group of servers, and to process the incoming multicast messages to produce multiple outgoing streams of outgoing multicast messages for delivery to recipients outside the group of the servers, wherein at least some of the incoming multicast messages are received at different servers in the group in different respective message orders, and wherein the instructions cause the servers to designate one of the servers as a leader and cause the leader to periodically determine a common message order for processing of the incoming multicast messages by the servers and to periodically transmit to the other servers in the group a control message indicative of the common message order determined by the leader, wherein the control message is transmitted with a quality of service (QoS) that is selected so as to ensure consistent delivery of the multicast messages over all the servers in the group, and wherein the instructions cause the servers to process, responsively to the control message, all the incoming messages at all the servers according to the common message order irrespective of the different orders in which the incoming messages are received and, responsively to the processing, to deliver the outgoing multicast messages in the outgoing message streams from the servers to all the recipients.

12. The product according to claim 11, wherein the control message is not sent by or to the message sources or the recipients of the outgoing multicast messages outside the group of the servers.

13. The product according to claim 11, wherein the instructions cause the leader to evaluate a criterion in order to decide when to send the control message, such that each control message indicates the common message order to be applied over multiple multicast messages.

14. The product according to claim 11, wherein the instructions cause the servers to enforce a real synchrony QoS, such that the processing of the incoming multicast messages by the servers is blocked until all the servers have received and processed the control message.

15. The product according to claim 11, wherein the instructions cause the leader to detect a requirement for synchronizing an operational state of the servers, and responsively to the requirement, to transmit a protocol message to the servers directing the servers to conform to a governing operational state of the leader.

16. The product according to claim 11, wherein the instructions cause the servers to detect a failure of the leader and, responsively to the failure, to elect a new leader among the servers and to synchronize an operational state of the servers with the new leader.

17. Communication apparatus, comprising plurality of servers, which are arranged in a group and are configured to receive concurrently incoming multicast messages from multiple message sources outside the group of servers, and to process the incoming multicast messages to produce multiple outgoing streams of outgoing multicast messages for delivery to recipients outside the group of the servers, wherein at least some of the incoming multicast messages are received at different servers in the group in different respective message orders, and wherein the servers are configured to designate one of the servers as a leader, wherein the leader periodically determines a common message order for processing of the incoming multicast messages by the servers and periodically transmits to the other servers in the group a control message indicative of the common message order determined by the leader, wherein the control message is transmitted with a quality of service (QoS) that is selected so as to ensure consistent delivery of the multicast messages over all the servers in the group, and wherein the servers are configured to process, responsively to the control message, all the incoming messages at all the servers according to the common message order irrespective of the different orders in which the incoming messages are received and, responsively to the processing, to deliver the outgoing multicast messages in the outgoing message streams from all servers to all the recipients.

18. The apparatus according to claim 17, wherein the control message is not sent by or to the message sources or the recipients of the outgoing multicast messages outside the group of the servers.

19. The apparatus according to claim 17, wherein the servers are configured to enforce a real synchrony QoS, such that the processing of the incoming multicast messages by the servers is blocked until all the servers have received and processed the control message.

20. The apparatus according to claim 17, wherein the servers are configured to detect a failure of the leader and, responsively to the failure, to elect a new leader among the servers and to synchronize an operational state of the servers with the new leader.

* * * * *